(12) United States Patent
Min

(10) Patent No.: US 9,746,902 B2
(45) Date of Patent: Aug. 29, 2017

(54) SYSTEM-ON-CHIP INCLUDING MULTI-CORE PROCESSOR AND DYNAMIC POWER MANAGEMENT METHOD THEREOF

(71) Applicant: SAMSUNG ELECTRONICS CO., LTD., Suwon-Si, Gyeonggi-Do (KR)

(72) Inventor: Junghi Min, Goyang-Si (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 99 days.

(21) Appl. No.: 14/679,828

(22) Filed: Apr. 6, 2015

(65) Prior Publication Data
US 2016/0011645 A1    Jan. 14, 2016

(30) Foreign Application Priority Data

Jul. 8, 2014    (KR) ........................ 10-2014-0085335

(51) Int. Cl.
*G06F 1/32*    (2006.01)

(52) U.S. Cl.
CPC ............ *G06F 1/3237* (2013.01); *G06F 1/324* (2013.01); *G06F 1/3206* (2013.01); *G06F 1/3287* (2013.01); *G06F 1/3296* (2013.01)

(58) Field of Classification Search
CPC ........ G06F 1/3202; G06F 1/3231; G06F 1/26; G06F 1/206; G06F 1/3228; G06F 1/08; G06F 1/3289; G06F 1/266; H04L 12/12; H04L 12/10
See application file for complete search history.

(56) References Cited

U.S. PATENT DOCUMENTS

| | | |
|---|---|---|
| 7,111,178 B2 | 9/2006 | Rusu et al. |
| 7,730,340 B2 | 6/2010 | Hu et al. |
| 7,739,532 B2 | 6/2010 | Grobman |
| 7,788,519 B2 | 8/2010 | Bailey et al. |
| 8,281,160 B1 | 10/2012 | Bai et al. |
| 8,364,997 B2 | 1/2013 | Tian et al. |
| 8,527,796 B2 | 9/2013 | Werner |

(Continued)

FOREIGN PATENT DOCUMENTS

EP    2485117    8/2012

OTHER PUBLICATIONS

A. Singh et al., "A Pluggable Framework for Lightweight Task Offloading in Parallel and Distributed Computing," pp. 1-16.
(Continued)

*Primary Examiner* — Zahid Choudhury
(74) *Attorney, Agent, or Firm* — F. Chau & Associates, LLC

(57) ABSTRACT

Provided is a control method of a system-on-chip including a multi-core processor. The control method includes detecting a rate of runnable tasks to be performed in the multi-core processor and a driving voltage or a driving clock of the multi-core processor, determining whether variation of the rate of the runnable tasks sampled from a first time point to a current time and variation of the driving voltage or the driving clock sampled from a second time point to the current time satisfy a hotplug condition, and
hotplugging in or out at least one core included in the multi-core processor when the rate of the runnable tasks and the driving voltage or the driving clock each satisfy the hotplug condition.

15 Claims, 12 Drawing Sheets

| RT / VF | Number of Runnable Task ≥ Number of On line Core | Number of Runnable Task < Number of On line Core |
|---|---|---|
| Low Voltage/Frequency | Preserving current status | Perform Hotplug-out |
| High Voltage/Frequency | Perform Hotplug-in | Preserving current status |

(56) References Cited

U.S. PATENT DOCUMENTS

| | | | |
|---|---|---|---|
| 8,650,426 B2 | 2/2014 | Rychlik et al. | |
| 8,695,008 B2* | 4/2014 | Regini | G06F 9/5094 713/322 |
| 8,775,830 B2 | 7/2014 | Sur et al. | |
| 8,862,917 B2 | 10/2014 | Ulmer et al. | |
| 8,880,924 B2* | 11/2014 | Ko | G06F 1/3206 713/320 |
| 8,892,916 B2 | 11/2014 | Bieswanger et al. | |
| 2013/0013911 A1 | 1/2013 | Gustafsson | |
| 2013/0060555 A1* | 3/2013 | Thomson | G06F 1/3203 703/21 |
| 2013/0111226 A1* | 5/2013 | Ananthakrishnan | G06F 1/26 713/300 |
| 2013/0132754 A1 | 5/2013 | Hanappe | |
| 2013/0155081 A1 | 6/2013 | Khodorkovsky et al. | |
| 2013/0179710 A1* | 7/2013 | Chang | G06F 1/3215 713/322 |
| 2013/0227326 A1* | 8/2013 | Gwak | G06F 1/3287 713/324 |
| 2013/0238912 A1* | 9/2013 | Priel | G06F 1/324 713/300 |
| 2014/0082612 A1* | 3/2014 | Breitgand | G06F 9/45533 718/1 |
| 2014/0156898 A1* | 6/2014 | Luo | G06F 13/4081 710/302 |
| 2014/0237274 A1* | 8/2014 | Murakami | G06F 1/3243 713/320 |

OTHER PUBLICATIONS

John Goodacre et al., "ARM11 MPCore and its impact on Linux Power Consumption," The Architecture for the Digital World, pp. 1-26.

"Variable SMP—A Multi-Core CPU Architecture for Low Piwer and High Performance," pp. 1-16.

* cited by examiner

| VF \ RT | Number of Runnable Task ≥ Number of On line Core | Number of Runnable Task < Number of On line Core |
|---|---|---|
| Low Voltage/Frequency | Preserving current status | Perform Hotplug-out |
| High Voltage/Frequency | Perform Hotplug-in | Preserving current status |

SYSTEM-ON-CHIP INCLUDING MULTI-CORE PROCESSOR AND DYNAMIC POWER MANAGEMENT METHOD THEREOF

CROSS-REFERENCE TO RELATED APPLICATIONS

This U.S. non-provisional patent application claims priority under 35 USC §119 to Korean Patent Application No. 10-2014-0085335, filed on Jul. 8, 2014, the disclosure of which is incorporated by reference in its entirety herein.

TECHNICAL FIELD

Embodiments of the present disclosure relate to semiconductor devices and, more particularly, to system-on-chips and power management methods thereof.

DISCUSSION OF RELATED ART

The use of mobile devices such as smartphones, tablet computers, digital cameras, media players, and personal digital assistants (PDAs) has grown significantly in recent years. Devices such as these are subjected to sophisticated and demanding processing tasks, and accordingly, high-speed processors and a mass storage media have made their way into these mobile devices. Mobile device are routinely used to execute sophisticated application programs. In a mobile device, semiconductor devices such as a working memory (e.g., DRAM), a nonvolatile memory, and an application processor (hereinafter referred to as "AP") are used to drive various application programs. To meet modern demands, these semiconductor devices, used in mobile devices, are designed to have increased integration density and driving frequencies.

Additionally, the demand for high performance in the mobile environment makes efficient power management difficult. However, without efficient power management, existing battery technology may not be able to provide mobile devices with sufficient service time without making the mobile device impractically large or heavy.

Multi-core processors may be used in an application processor to provide high performance for mobile devices. Moreover, hardware-based methods or various software-based control techniques are applied for efficient power management in the multi-core environment.

SUMMARY OF THE INVENTION

Exemplary embodiments of the present disclosure provide a control method of a system-on-chip including a multi-core processor. The control method may include detecting a rate of runnable tasks to be performed in the multi-core processor and a driving voltage or a driving clock of the multi-core processor. It is determining whether variation of the rate of the runnable tasks sampled from a first time point to a current time and variation of the driving voltage or the driving clock sampled from a second time point to the current time satisfy a hotplug condition. Hotplug-in or hotplug-out is performed on at least one core included in the multi-core processor when the rate of the runnable tasks and the driving voltage or the driving clock each satisfy the hotplug condition.

Exemplary embodiments of the present disclosure provide a system-on-chip. The system-on-chip may include a multi-core processor including a plurality of cores. A working memory is provided. An operating system driven by the multi-core processor is loaded into the working memory. A run queue corresponding to each of the cores is established in the working memory. The operating system may include a kernel adapted to control a hotplug operation of the multi-core processor. The kernel may determine whether the hotplug operation is executed on the cores by using a result obtained by sampling a runnable task rate and a driving voltage and a driving clock of the multi-core processor two or more times.

Exemplary embodiments of the present disclosure provide a method for managing power of a system-on-chip including a multi-core processor. The power management method may include determine whether hotplug conditions are met. The hotplug conditions may include determining a runnable task rate of the multi-core processor at a plurality of sampling time points and may include a driving voltage or a driving clock of the multi-core processor detected at the plurality of sampling time points. A hotplug operation is performed to supply or cut off power to at least one core included in the multi-core process.

A method for controlling core activation in a multi-core processor including a plurality of processing cores includes determining a number of tasks to be executed by the multi-core processor at a first time. A number cores of the plurality of processing cores that is in an on-line state at the first time is determined. A runnable task rate for the first time is calculated by dividing the determined number of tasks to be executed at the first time by the determined number of cores in the on-line state at the first time. A number of tasks to be executed by the multi-core processor at a second time is determined. A number cores of the plurality of processing cores that is in an on-line state at the second time is determined. A runnable task rate for the second time is calculated by dividing the determined number of tasks to be executed at the second time by the determined number of cores in the on-line state at the second time. It is determined whether one or more cores of the plurality of cores of the multi-core processor are to be changed from the on-line state to an off-line state and whether one or more cores of the plurality of cores of the multi-core processor are to be changed from the off-line state to the on-line state based on a difference between the calculated runnable task rates for the second and first times.

In calculating the runnable task rate for the first and second times, an offset value may be added to the number of tasks to be executed before it is divided by the number of cores in the on-line state.

The number of tasks to be executed by the multi-core processor at a first and second times may be calculated by monitoring one or more run queues of the multi-core processor.

One or more cores of the plurality of cores of the multi-core processor may be brought on-line, using a hotplug-in operation, when it is determined that one or more cores of the plurality of cores of the multi-core processor are to be changed from the off-line state to the on-line state. One or more cores of the plurality of cores of the multi-core processor may be brought off-line, using a hotplug-out operation, when it is determined that one or more cores of the plurality of cores of the multi-core processor are to be changed from the on-line state to the off-line state.

The determining of whether the one or more cores of the plurality of cores of the multi-core processor are to be changed from the on-line state to the off-line state and the determining of whether the one or more cores of the plurality of cores of the multi-core processor are to be changed from the off-line state to the on-line state may be based further on either a driving voltage of the multi-core processor or the driving clock of the multi-core processor.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein.

DETAILED DESCRIPTION

Figure 1:
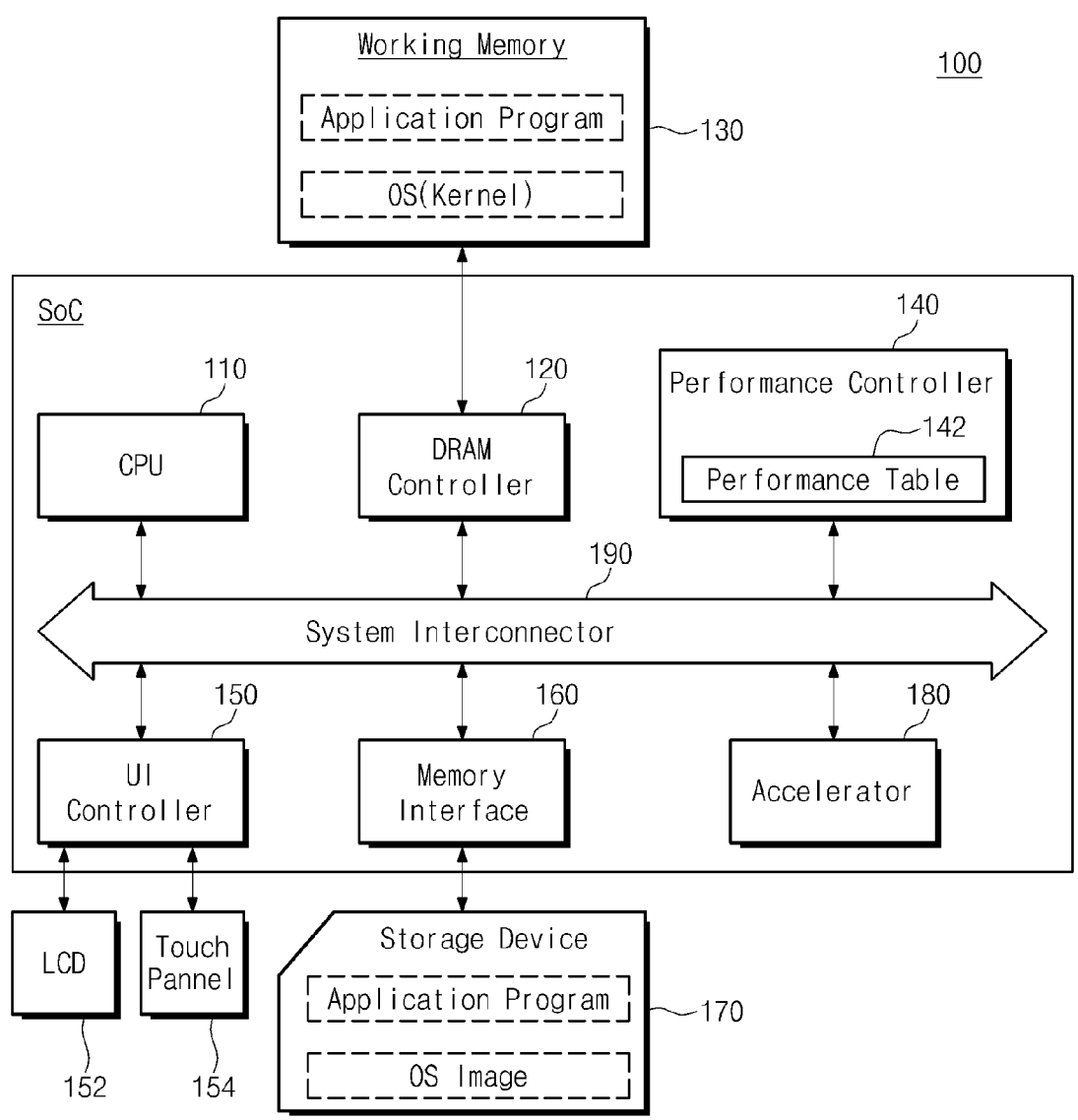
FIG. 1 is a block diagram of a mobile device according to an exemplary embodiment of the present inventive concept.

Embodiments of the inventive concept will be described in detail with reference to the accompanying drawings. The inventive concept, however, may be embodied in various different forms, and should not be construed as being limited only to the illustrated embodiments. Rather, these embodiments are provided as examples so that this disclosure will be thorough and complete, and will fully convey the concept of the inventive concept to those skilled in the art. Accordingly, known processes, elements, and techniques might not be described with respect to some of the embodiments of the inventive concept. Like reference numerals may denote like elements throughout the attached drawings and written description.

FIG. 1 is a block diagram of a mobile device 100 according to an exemplary embodiment of the present inventive concept. As illustrated, the mobile device 100 may include a system-on-chip (SoC), a working memory 130, a liquid crystal display (LCD) 152, a touch panel 154, and a storage device 170. The system-on-chip (SoC) may include a central processing unit (CPU) 110, a DRAM controller 120, a performance controller 140, a user interface controller (UI controller) 150, a memory interface 160, and an accelerator 180. It will be understood that components of the mobile device 100 are not limited to the components shown in FIG. 1. For example, the mobile device 100 may further include a hardware codec for processing image data, a security block, and the like.

The CPU 110 executes software (for example, an application program, an operating system (OS), and device drivers) for the mobile device 100. The CPU 110 may execute the operating system (OS) which may be loaded into the working memory 130. The CPU 110 may execute various application programs to be driven on the operating system (OS). The CPU 110 may be provided as a homogeneous multi-core processor or a heterogeneous multi-core processor. A multi-core processor is a computing component including at least two independently drivable processors (hereinafter referred to as "cores"). Each of the cores may independently read and execute program instructions.

Each of the multiple cores of the CPU 110 may include a plurality of power domains that operate with an independent driving clock and an independent driving voltage. The driving voltage and the driving clock provided to each of the multiple cores may be cut off or connected in units of single cores. Hereinafter, an operation of cutting off the driving voltage and the driving clock provided to each of the power domains from a specific core will be referred to as "hotplug-out". An operation of providing the driving voltage and the driving clock to a specific core will be referred to as "hotplug-in". In addition, a frequency of the driving clock and a level of the driving voltage provided to each of the power domains may vary depending on a processing load of each core. For example, as time required for processing tasks becomes longer, each of the cores may be controlled by means of dynamic voltage frequency scaling (hereinafter referred to as "DVFS") that increases the frequency of the driving clock or the level of the driving voltage provided to a corresponding power domain. According to an exemplary embodiment of the present inventive concept, hotplug-in and hotplug-out may be performed with reference to the level of the driving voltage and the frequency of the driving clock of the CPU 110 adjusted through DVFS.

The CPU 110 may perform hotplug-in and hotplug-out with reference to both the number of tasks assigned to multi-cores and the number of cores activated to be working among the multi-cores. A kernel of the operating system (OS) may monitor the number of tasks in a run queue and the driving voltage and the driving clock of the CPU 110 at specific time intervals to control the CPU 110. In addition, a kernel of the operating system (OS) may control hotplug-in or hotplug-out of the CPU 110 with reference to the monitored information.

The DRAM controller 120 provides interfacing between the working memory 130 and the system-on-chip (SoC). The DRAM controller 120 may access the working memory 130 according to a request of the CPU 110 or another intellectual property (IP) block. For example, the DRAM controller 120 may write data into the working memory 130 according to a write request of the CPU 110. Alternatively, the DRAM controller 120 may read data from the working memory 130 according to a read request of the CPU 110 and transmit the read data to the CPU 110 or the memory interface 160 through a data bus.

The operating system (OS) or basic application programs may be loaded into the working memory 130 during a booting operation. For example, an OS image stored in the storage device 170 is loaded into the working memory 130 based on a booting sequence during booting of the mobile device 100. Overall input/output operations of the mobile device 100 may be supported by the operating system (OS). Similarly, application programs may be loaded into the working memory 130 to be selected by a user or to provide a basic service. Moreover, the working memory 130 may be used as a buffer memory to store image data provided from an image sensor such as a camera. The working memory 130 may be a volatile memory such as a static random access memory (SRAM) and a dynamic random access memory (DRAM) or a nonvolatile memory device such as a phase-change random-access memory (PRAM), a magnetoresistive random-access memory (MRAM), a resistive random-access memory (ReRAM), a ferroelectric random-access memory (FRAM), and a NOR flash memory.

The performance controller 140 may adjust operation parameters of the system-on-chip (SoC) according to a control request provided from the kernel of the operating system (OS). For example, the performance controller 140 may adjust the level of DVFS to enhance performance of the system-on-chip (SoC). Alternatively, the performance controller 140 may control a driving mode of a multi-core processor such as Big.LITTLE (a heterogeneous computing architecture developed by ARM Holdings) of the CPU 110 according to a request of the kernel. In this case, the performance controller 140 may include a performance table 142 to set a driving voltage and a frequency of a driving clock therein.

The user interface controller 150 controls user input and output from user interface devices. For example, the user interface controller 150 may display a keyboard screen for inputting data to the LCD 152 according to the control of the CPU 110. Alternatively, the user interface controller 150 may control the LCD 152 to display data that a user requests. The user interface controller 150 may decode data provided from user input means, such as a touch panel 154, into user input data.

The memory interface 160 accesses the storage device 170 according to a request of the CPU 110. For example, the memory interface 160 provides interfacing between the system-on-chip (SoC) and the storage device 170. For example, data processed by the CPU 110 is stored in the storage device 170 through the memory interface 160. Alternatively, data stored in the storage device 170 may be provided to the CPU 110 through the memory interface 160.

The storage device 170 is provided as a storage medium of the mobile device 100. The storage device 170 may store application programs, an OS image, and various types of data. The storage device 170 may be provided as a memory card (e.g., MMC, eMMC, SD, MicroSD, etc.). The storage device 170 may include a NAND-type flash memory with high-capacity storage capability. Alternatively, the storage device 170 may include a next-generation nonvolatile memory such as PRAM, MRAM, ReRAM, and FRAM or a NOR-type flash memory. According to an exemplary embodiment of the inventive concept, the storage device 170 may be an embedded memory incorporated in the system-on-chip (SoC).

The accelerator 180 may be provided as a separate intellectual property (IP) component to increase processing speed of a multimedia or multimedia data. For example, the accelerator 180 may be provided as an intellectual property (IP) component to enhance processing performance of a text, audio, still images, animation, video, two-dimensional data or three-dimensional data.

A system interconnector 190 may be a system bus to provide an on-chip network in the system-on-chip (SoC). The system interconnector 190 may include, for example, a data bus, an address bus, and a control bus. The data bus is a data transfer path. A memory access path to the working memory 130 or the storage device 170 may also be provided. The address bus provides an address exchange path between intellectual properties (IPs). The control bus provides a path along which a control signal is transmitted between intellectual properties (IPs). However, the configuration of the system interconnector 190 is not limited to the above description and the system interconnector 190 may further include arbitration means for efficient management.

According to the foregoing description, the mobile device 100 performs hotplug-in or hotplug-out of a core in consideration of both the number of runnable tasks assigned to the CPU 100 and CPU driving voltage and driving clock. In particular, the mobile device 100 performs a hotplug operation using the number of tasks loaded to a run queue and a cumulative sampling result of CPU driving voltage and driving clock. For example, the mobile device 100 performs hotplug-in or hotplug-out only when the number of tasks loaded to a run queue sampled two or more times during a predetermined time period and the CPU driving voltage and driving clock satisfy hotplug conditions.

According to the above function, the mobile device 100 may assign a task optimized to the driving environment of each of the multiple cores that vary in real time. In addition, the mobile device 100 may minimize a situation where the multiple cores remain in an idle status in which they perform no operation in an on-line status (power supply status). Thus, power efficiency may be increased.

Figure 2:
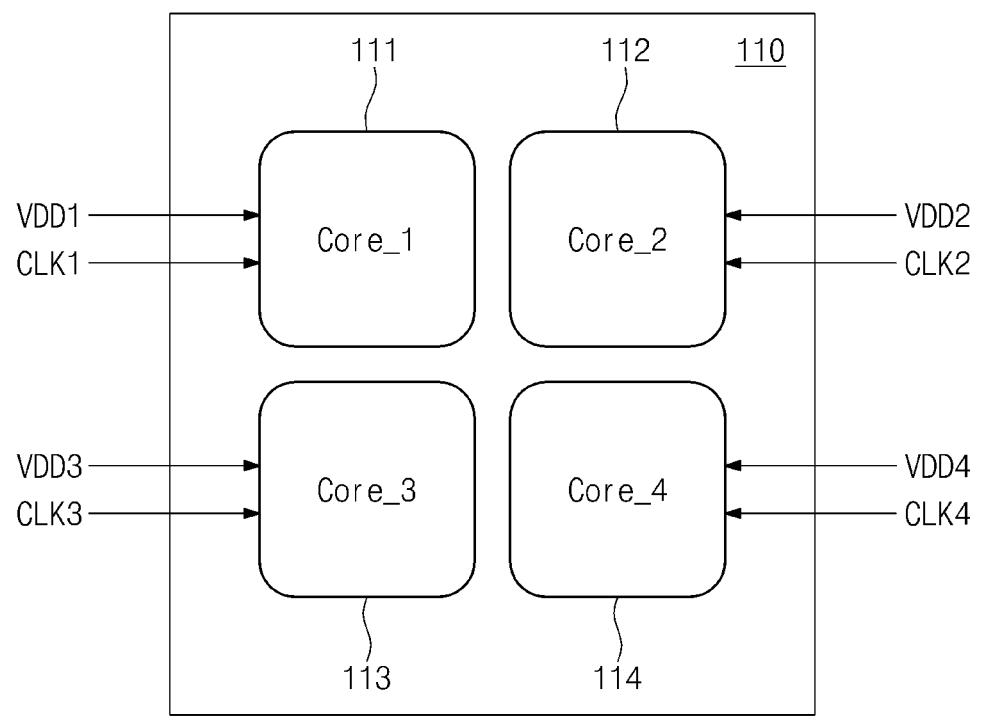
FIG. 2 illustrates a structure of a CPU shown in FIG. 1.

FIG. 2 illustrates a structure of the CPU 110 shown in FIG. 1. Referring to FIG. 2, the CPU 110 may include multiple homogeneous cores in a single power domain. However, it will be understood that the inventive concept may be readily applied in the CPU 110 including multiple heterogeneous cores.

The same power supply voltage VDD and the same driving clock CLK may be provided to cores 111, 112, 113, and 114 included in an independent power domain. For example, driving voltages VDD1, VDD2, VDD3, and VDD4 are respectively provided to the cores 111, 112, 113, and 114 may be 1.2V, 1.0V, 0.8V, or 0.6V. Clocks CLK1, CLK2, CLK3, and CLK4 are respective provided to the cores 111, 112, 113, and 114 may have the same frequency. When the CPU 110 is controlled by means of DVFS, variation of a driving voltage and a clock frequency may be commonly applied to all the cores 111, 112, 113, and 114.

However, each of the cores 111, 112, 113, and 114 may be powered off or connected by a hotplug manner. For example, when only the core 111 performs an assigned task and the other cores 112, 113, and 114 are in an idle status for a fixed period of time, the cores 112, 113, and 114 may be powered off. This operation is called hotplug-out. When there is a load that is too excessive to be processed in the activated core 111, power may supplied to at least one of the cores 112, 113, and 114 powered off by the hotplug-out to make task processing possible. This operation is called hotplug-in. In the CPU 110 having the above multi-core structure, control using the hotplug manner is supported by hardware (e.g., performance controller 140) but the decision of when to hotplug-in or hotplug-out may be made by a kernel of an operating system (OS).

Figures 3, 4:
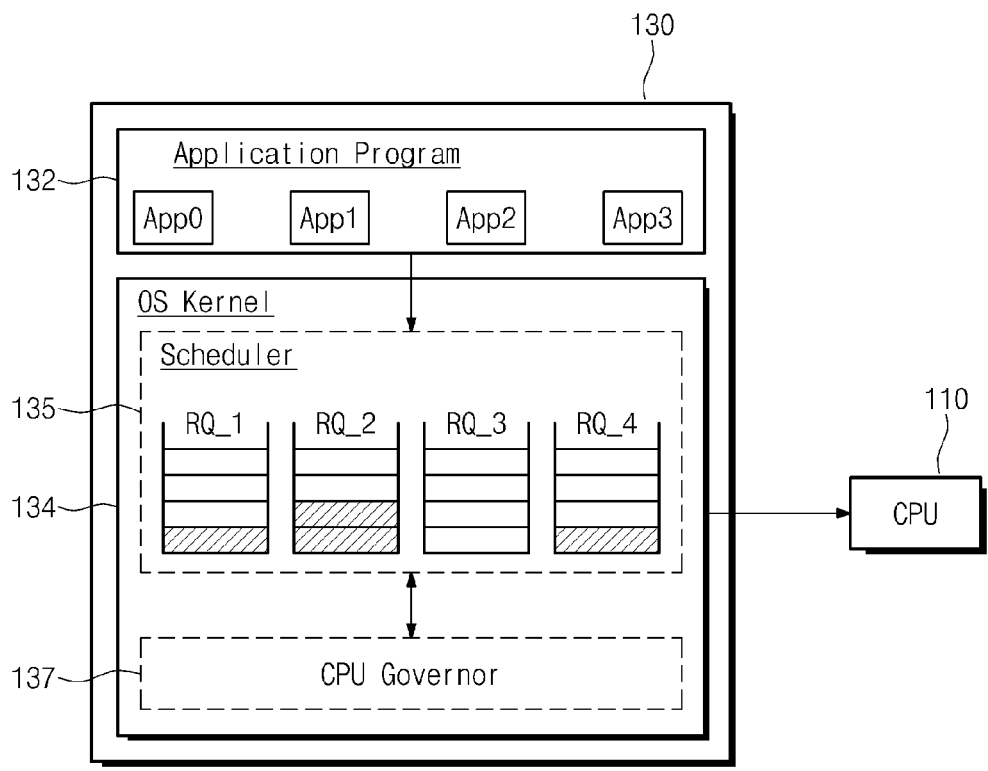
FIG. 3 is a block diagram illustrating a software structure of the mobile device shown in FIG. 1.
FIG. 4 is a table showing hotplug conditions according to an exemplary embodiment of the present inventive concept.

FIG. 3 is a block diagram illustrating a software structure of the mobile device 100 shown in FIG. 1. Referring to FIG. 3, a software layer structure of the mobile device 100 loaded into the working memory 130 and driven by the CPU 110 may be divided into an application program 132 and a kernel 134. The operating system (OS) may further include one or more device drivers to manage various devices such as a memory, a modem, and an image processing device.

The application program 132 may be upper layer software driven as basic service or driven by a user's request. A plurality of application programs App0, App1, App2, and App3 may be simultaneously executed to provide various services. The application programs App0, App1, App2, and App3 may be executed by the CPU 110 after being loaded into the working memory 130. For example, when playing a video file is requested by the user, an application program (e.g., video player) is executed to play the video file. Then the executed player may generate a read request or a write request to the storage device 170 to play the video file requested by the user.

The kernel 134, as a component of the operating system (OS), performs a control operation between the application program 132 and hardware. The kernel 134 may include program execution, interrupt, multi-tasking, memory management, a file system, and a device driver. According to an exemplary embodiment of the present inventive concept, only a scheduler 135 and a CPU governor 137, provided as parts of the kernel 134, will be described. It is to be assumed that the kernel 134 may include other components as well.

The kernel 134 may include the scheduler 135 and the CPU governor 137. The scheduler 135 monitors and manages a run queue for each of the multiple cores 111, 112, 113, and 114. The run queue is a queue of active tasks when a plurality of tasks are simultaneously performed. For example, tasks existing in the run queue may be quickly processed by the CPU 110, as compared to other tasks. The scheduler 135 may determine a subsequent process with reference to task information loaded into the run queue. For example, the scheduler 135 decides the priority of CPU resources according to a value of the run queue. In a Linux kernel, a run queue has a run queue corresponding to each of multiple cores. For example, a run queue RQ_1 is a run queue into which a task to be performed by a first core (Core_1) 111 may be loaded, and a run queue QR_2 is a run queue into which a task to be performed by a second core (Core_2) 112 may be loaded. Similarly, a run queue RQ_3 is a run queue into which a task to be performed by a third core (Core_3) 113 may be loaded, and a run queue QR_4 is a run queue into which a task to be performed by a fourth core (Core_4) 114 may be loaded.

The scheduler 135 may assign tasks respectively corresponding to run queues RQ_1, RQ_2, RQ_3, and RQ_4 to a corresponding core. Task loaded into the run queues RQ_1, RQ_2, RQ_3, and RQ_4 to be performed by the CPU 110 are called runnable tasks. The scheduler 135 may monitor the number of runnable tasks during a specific sampling period to control a hotplug operation of the cores of the CPU 110.

For example, when the number of runnable tasks is equal to or greater than the number of currently managed on-line cores by a reference value, it is determined that the scheduler 135 satisfies the hotplug-in condition at a sampled point of time. Meanwhile, when the number of current runnable tasks is detected to be smaller than the number of currently managed on-line cores by the reference value, it is determined that the scheduler 135 satisfies the hotplug-out condition.

In the inventive concept, a runnable task rate (RT) obtained by dividing the number of runnable tasks by the number of on-line cores is defined. When the runnable task rate (RT) is greater than 1, it is probable that a current runnable task will be delayed. In this case, a reference value where the runnable task rate (RT) becomes greater than 1 may be adjusted by additionally considering an offset between the number of the on-line cores and the number of the runnable tasks. For example, the runnable task rate (RT) may be calculated by '(the number of runnable tasks+offset)/the number of on-line cores' or 'the number of runnable tasks/(the number of on-line cores+offset)'. However, the reference of the runnable task rate (RT) is not limited thereto and another type of index may be adopted which may indicate a probability that a runnable task is delayed.

The kernel 134 may perform a hotplug operation based on cumulative conditions rather than based on a decision at a certain point in time. For example, the scheduler 135 may sample the number of runnable tasks and the number of on-line cores at regular time intervals. For example, the scheduler 135 detects whether or not the hotplug-in or hotplug-out condition has been satisfied by accumulating the runnable task rate (RT) based on the number of runnable task and the number of on-line CPU cores for a first time period ($\Delta T1$) until now from a specific point of time in each sampling period.

The CPU governor 137 may obtain a driving voltage and a driving clock of the CPU 110 in the kernel 134. A frequency of a driving clock CLK or a level of a driving voltage VDD may be determined according to the driving voltage and the driving clock of the CPU 110. However, it will be understood that the driving voltage and the driving clock of the CPU 110 are not limited thereto. The CPU governor 137 may adjust the driving voltage and the driving clock frequency of the CPU 110 according to a request of the kernel 134 or the scheduler 135. There may be a component to adjust the frequency of the driving clock or the level of the driving voltage of the CPU 110 by hardware according to the control of the CPU governor 137 driven at the layer of the kernel 134. For example, the performance controller 140 varying a driving clock and a driving voltage of the CPU 110 or various components may control the driving voltage and the driving clock of the CPU 110 by hardware according to a call of the kernel 134 that is software.

The kernel 134 may sample the driving voltage and the driving clock of the CPU 110 at a period and a time point that are identical to or different from a period and a time point at which the number of runnable tasks and the number of on-line cores are sampled. The kernel 134 detects whether the driving voltage and the driving clock of the CPU 110 continuously satisfy the hotplug-in or hotplug-out condition for a second time period ($\Delta T2$) in each sampling period.

The kernel 134 performs a hotplug operation only when both the runnable task rate (RT) and the CPU driving voltage and driving clock (VF) satisfy the hotplug-in or hotplug-out condition. However, when at least one of the runnable task rate (RT) and the CPU driving voltage and driving clock (VF) does not satisfy the hotplug condition, the kernel 134 may hold the number of current on-line cores of the CPU 110.

Hitherto, the brief description has been made with respect to the power management method of a multi-core processor performed at a layer of the kernel 134 of the operating system (OS) according to exemplary embodiments of the present inventive concept. According to exemplary embodiments of the present inventive concept, hotplug-in or hotplug-out may be performed when each of the runnable task rate (RT) and the CPU driving voltage and driving clock (VF) for a fixed period of time satisfy the hotplug condition. Thus, when any one condition of the runnable task rate (RT) and the CPU driving voltage and driving clock (VF) at the current time is satisfied, an unnecessary hotplug operation that occurs when a hotplug operation is performed may be blocked.

FIG. 4 is a table showing hotplug conditions according to an exemplary embodiment of the present inventive concept. Referring to FIG. 4, the kernel 134 may perform a hotplug operation according to a runnable task rate (RT) and CPU driving voltage and driving clock (VF).

The CPU driving voltage and driving clock (VF) may be classified into, for example, two levels. For example, when a driving clock frequency of the CPU 110 is maintained to be higher than a reference frequency for a fixed period of time, the CPU driving voltage and driving clock (VF) may be classified as high voltage/frequency. On the other hand, when a driving clock frequency of the CPU 110 is maintained to be lower than a reference frequency for a fixed period of time, the CPU driving voltage and driving clock (VF) may be classified as low voltage/frequency. However, it will be understood that the CPU driving voltage and driving clock (VF) may be defined as various levels other than the levels described herein. In particular, it will be understood that the runnable task rate (RT) and the CPU driving voltage and driving clock (VF) are cumulative values of results sampled two or more times for a fixed period of time, respectively.

Consideration is given to a state in which a current runnable task rate (RT) is greater than 1 and CPU driving voltage and driving clock (VF) is low voltage/frequency. In this state, the CPU driving voltage and driving clock (VF) classified by the CPU governor 137 is low even though the runnable task rate (RT) is greater than 1. Accordingly, there is no problem in processing a task by current online cores without additional hotplug-in. Accordingly, a current driving status of the CPU 110 may be preserved.

On the other hand, consideration is given to a case in which a current runnable task rate (RT) is greater than 1 and CPU driving voltage and driving clock is high voltage/frequency. This state may indicate that additional hotplug-in is required. Accordingly, hotplug-in must be performed by selecting any one core managed in a current off-line status. In addition, the balance of a workload may be maintained by distributing tasks concentrated on any one core to a hotplugged-in core.

Consideration is given to a status in which a runnable task rate (RT) is equal to or smaller than 1 and CPU driving voltage and driving clock (VF) is low voltage/frequency. This status may indicate that both the runnable task rate (RT) and the CPU driving voltage and driving clock (VF) maintain a hotplug-out condition for a specific period of time. For example, at least one core remains in an idle status. Accordingly, the kernel 134 may select and hotplug-out any one core that remains in an idle status.

Consideration is given to a state in which a runnable task rate (RT) is equal to or smaller than 1 and CPU driving voltage and driving clock (VF) is high voltage/frequency. This state may indicate that the computation quantity of a currently executed task is large. Thus, even in this case, a current driving status of the CPU 110 may be preserved.

Hitherto, the brief description has been made with respect to a condition table of a hotplug operation for briefly describing an exemplary embodiment of the present inventive concept. Features of the inventive concept have been described by classifying CPU driving voltage and driving clock (VF) and a runnable task rate (RT) into two cases. However, the hotplug operation condition of the inventive concept may be described by more detailed classification of the references of the CPU driving voltage and driving clock (VF) and the runnable task rate (RT) into various cases.

Figure 5:
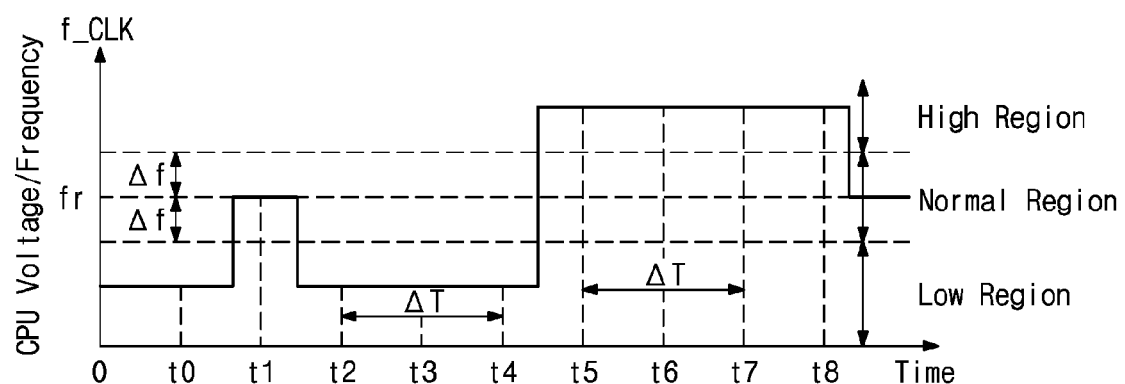
FIG. 5 is a graph showing an example of a CPU usage rate according to an exemplary embodiment of the present inventive concept.

FIG. 5 is a graph showing an example of CPU driving voltage and driving clock (VF). Referring to FIG. 5, the CPU driving voltage and driving clock (VF) may be determined by checking a driving voltage and a frequency of a driving clock of an on-line core. The driving voltage and the driving clock are associated with each other and adjusted even after a DVFS process. In general, increase and decrease of the driving voltage and the driving clock tend to be in the same direction. Accordingly, hotplug-in or hotplug-out may be determined even when only one of the driving voltage and the frequency of the driving clock is measured. In FIG. 5, an example in which a driving clock is sampled when the driving voltage and driving clock are sampled will be described. When a frequency of the driving clock is sampled, a frequency used as a reference will be referred to as a reference frequency fr. A clock frequency f_clk corresponds to a high-frequency driving clock belonging to a high region that is higher than the reference frequency fr by a specific magnitude Δf. A clock frequency f_clk corresponds to a low-frequency driving clock belonging to a low region that is lower than the reference frequency fr by a specific magnitude Δf. A frequency range belonging to a region in which an operation frequency difference is equal to or smaller than the reference frequency fr by the specific magnitude Δf may be represented as a normal region. It may be assumed that each of the time points t0 to t8 is a time point when the CPU driving clock is sampled.

It may be assumed that the frequency f_clk of the driving clock CLK starts from a low region at first. After the time point to, the frequency f_clk of the driving clock increases to the reference frequency fr. Although not shown the drawings, it will be understood that in the CPU 110 driven by means of DVFS, the frequency f_clk of the driving clock may rise along with the level of the driving voltage. Before reaching the time point t2, after the time point t1 has passed, the frequency f_clk of the driving clock decreases to the low region. Until a time point when the time point t4 has passed, the frequency f_clk of the driving clock is maintained at a value belonging to the low region. After the time point t4, the frequency f_clk of the driving clock increases to the high region. Until a time point when the time point t8 has passed, the frequency f_clk of the driving clock is maintained at a value belonging to the high region and then returns to the reference frequency fr. Since the CPU driving voltage may be sampled in the same manner as the frequency of the CPU driving clock, its detailed description will be omitted herein. When the CPU driving voltage and the frequency of the CPU driving clock are sampled, the CPU driving voltage and driving frequency may be confirmed by periodically reading the performance table 142 in FIG. 1.

In the above, a method of sampling CPU driving voltage and driving clock has been described through an example of CPU frequency variation. CPU driving voltage and driving clock (VF) are sampled at each of time points t0, t1, t2, . . . , and t8. However, the CPU driving voltage and driving clock (VF) may be determined with reference to a cumulative value for a fixed period of time (ΔT) rather than being provided as a size at a certain time point. For example, it will be understood that the CPU driving voltage and driving clock (VF) satisfies the hotplug condition when a plurality of successive sampling values are maintained at a constant value. For example, since a status of a CPU sampled at the time point t2 corresponds to low voltage and low clock (low region) and is a normal status at the previous time point t1, the CPU driving voltage and driving clock (VF) is determined to not have satisfied the hotplug condition. Meanwhile, when sampling is performed at the time point t4, low driving voltage and driving clock (low region) is continued for successive three sampling time points t2, t3, and t4. Therefore, the CPU driving voltage and driving clock (VF) may be determined to have satisfied the hotplug condition.

Although the sampling is additionally performed with high driving voltage and driving clock (high voltage) at the time point t5, the sampling was performed with low voltage and driving clock at the sampling time points t3 and 4. Therefore, the CPU driving voltage and driving clock (VF) are considered to have not satisfied the hotplug condition. Meanwhile, since the same high driving voltage and driving clock are being maintained at the time point t7 from the previous sampling time points t5 and t6, the CPU driving voltage and driving clock (VF) are considered to have satisfied the hotplug condition. In this case, the CPU driving voltage and driving clock (VF) may be provided as high driving voltage and driving clock that satisfy the hotplug condition.

Hitherto, the description has been made with respect to an example in which cumulative CPU driving voltage and driving clock (VF) are used to determine whether or not the hotplug condition has been satisfied. However, it will be understood by those skilled in the art that the above method is merely exemplary and a cumulative value of the CPU driving voltage and driving clock (VF) may be determined according to various methods and references.

Figure 6:
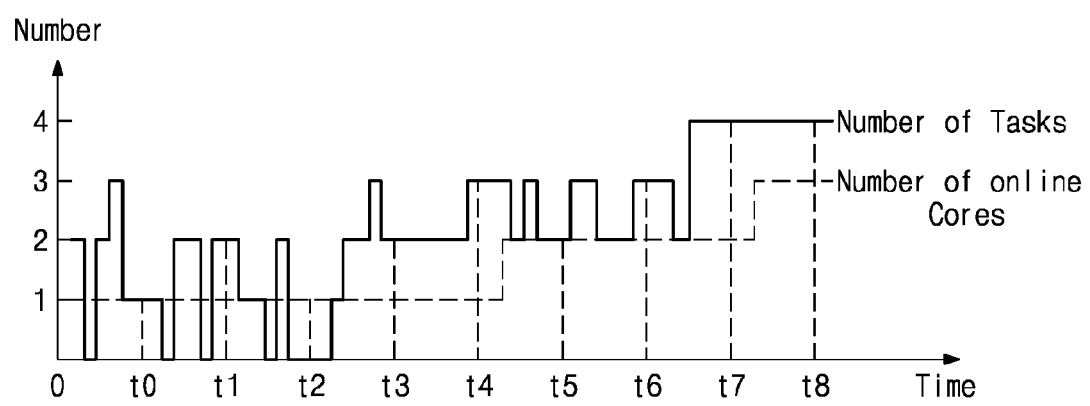
FIG. 6 is a graph showing an approach for determining the number of runnable tasks according to an exemplary embodiment of the present inventive concept.

FIG. 6 is a graph showing an example of deciding a runnable task rate (RT) according to exemplary embodiments of the present inventive concept. Referring to FIG. 6, the runnable task rate (RT) may be detected depending on whether the number of runnable tasks is greater or smaller than the number of current on-line cores. It may be assumed that an offset set between the number of the runnable tasks and the number of the on-line cores is zero to monitor the runnable task rate (RT).

In the figures, the dotted lines denote variation of the number of cores maintained at an on-line status, and the solid lines denote a runnable task rate (RT) that varies in real time. It may be assumed that each of time points t0 to t8 is a time point when the number of the runnable tasks and the number of the on-line cores.

The number of tasks loaded to a run queue corresponding to each of multi-cores is monitored by the scheduler 134. For example, a determination is made on whether a runnable task rate (RT) satisfies the hotplug condition with reference to a plurality of sampling values that are successive for a fixed period of time. For example, the number of runnable tasks sampled at the time point t1 is two. At this point, the number of on-line cores is one. However, since the number of runnable tasks at the time point t0 is one, it is equal to the number of the on-line cores. Accordingly, the scheduler may determine that the runnable task rate (RT) does not continuously satisfy the hotplug condition.

On the other hand, the number of runnable tasks sampled at the time point t4 is three. At this point, the number of on-line cores is two. Accordingly, the number of the runnable tasks is greater than that of the on-line cores. Even at the sampling time point t3, the number of sampled runnable tasks is greater than that of the on-line cores. Accordingly, the scheduler 134 may determine that runnable task rate (RT) satisfies the hotplug condition. For example, the scheduler 134 determines that the runnable task rate (RT) satisfies the hotplug condition when the number of runnable tasks is smaller or greater than the number of on-line cores at a plurality of fixed successive sampling time points. Meanwhile, the scheduler 134 determines that the runnable task rate (RT) does not satisfy the hotplug condition when the number of runnable tasks is equal to the number of on-line cores at a plurality of fixed successive sampling time points As described above, according to exemplary embodiments of the present inventive concept, a relative difference of the number of runnable tasks to the number of on-line cores is sampled. However, exemplary embodiments of the present inventive concept are not limited thereto. Satisfaction of the hotplug condition may be determined depending on whether the number of runnable tasks increases to be equal to or greater than a specific number.

Figure 7:
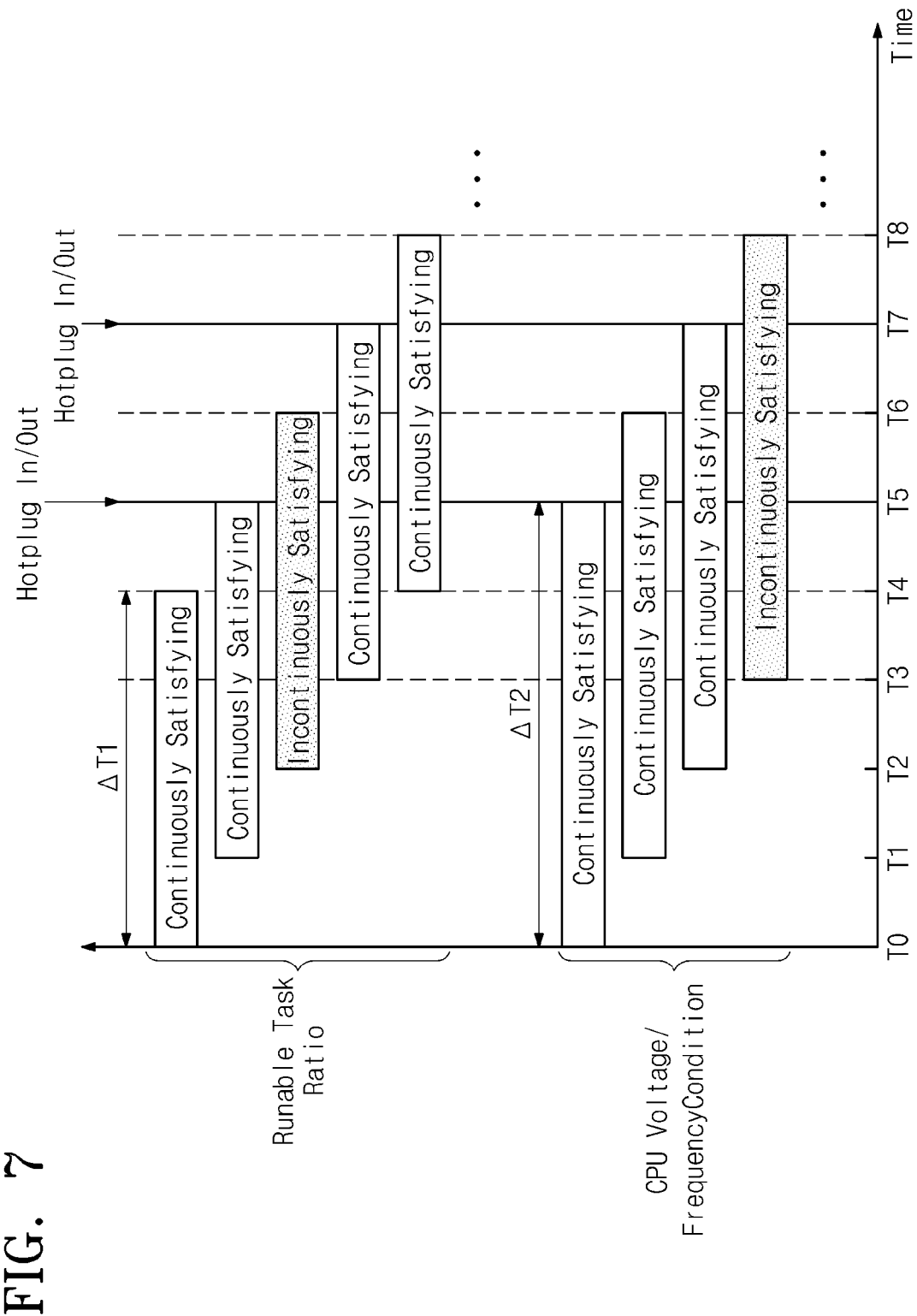
FIG. 7 is a timing diagram illustrating a method of sampling the number of runnable tasks and a CPU usage rate of a multi-core according to an exemplary embodiment of the present inventive concept.

FIG. 7 is a timing diagram illustrating a method of determining a runnable task rate (RT) and CPU driving voltage and driving clock (VF) of multi-cores according to an exemplary embodiment of the present inventive concept. Referring to FIG. 7, a kernel 134 determines whether or not a hotplug condition has been satisfied with reference to both a runnable task rate (RT) and CPU driving voltage and driving clock (VF) sampled for a specific time. A time period ΔT1 for determining the hotplug condition for the runnable task rate (RT) may be set to a different value than a time period ΔT2 for determining the CPU driving voltage and driving clock (VF). This is because a variation period of the number of tasks loaded to a run queue may be shorter than a variation period of the CPU driving voltage and driving clock (VF).

First, the runnable task rate (RT) may be sampled in real time at a time point t4. An estimation is made on whether the runnable task rate (RT) cumulative from a time point t0 and continuing therefrom satisfies the hotplug condition. A determination is made on whether variation of the runnable task rate (RT) sampled during a time period t0 to t4 is constantly maintained to satisfy the hotplug condition. For example, detection is made on whether the runnable task rate (RT) is maintained to be smaller or greater than the number of on-line cores during the time period t0 to t4. It may be assumed that the number of runnable tasks is maintained to be smaller than the number of on-line cores during the time period t0 to t4. Since the hotplug condition for the CPU driving condition and driving clock (VF) at the time point t4 is not estimated, a hotplug operation is not performed on the multi-cores by using a sampling result of the time point t4.

At a time point t5, the runnable task rate (RT) may be sampled in real time. In addition, an estimation is made on whether the runnable task rate (RT) cumulative from the time point t1 and continuing therefrom satisfies the hotplug condition. When variation of the runnable task rate (RT) sampled during a time period t1 to t5 is maintained to satisfy the hotplug condition, the scheduler 135 (see FIG. 3) determines that the runnable task rate (RT) satisfies the hotplug condition. Moreover, an estimation may be made on whether at the time point t5, the hotplug condition is satisfied with reference to a sampling result of the CPU driving voltage and driving clock (VF) during a time period t0 to t5. When variation of the CPU driving voltage and driving clock (VF) sampled during the time period t0 to t5 is maintained to satisfy the hotplug condition, the kernel 134 may decide hotplug-in or hotplug-out according to the reference explained in FIG. 4.

At a time point t6, the runnable task rate (RT) and the CPU driving voltage and driving frequency (VF0) are sampled. However, an estimation was made that at the time point t6, a cumulative value of the CPU driving voltage and driving clock (VF) satisfied the hotplug condition but a cumulative value of the runnable task rate (RT) did not satisfy the hotplug condition. Accordingly, in this case, a current driving status of the CPU 110 may be preserved.

At a time point t7, the runnable task rate (RT) and the CPU driving voltage and driving clock (VF) may be monitored. For example, an estimation may be made on whether the runnable task rate (RT) sampled from the time point t3 continuously satisfies the hotplug condition. In addition, an estimation may be made on whether variation of the CPU driving voltage and driving clock (VF) from the time point t2 to the time point t7 satisfies the hotplug condition. An estimation was made that both cumulative values of the runnable task rate (RT) and the CPU driving voltage and driving clock (VF) satisfied the hotplug condition. Accordingly, the kernel 134 may decide hotplug-in or hotplug-out according to the reference explained above with respect to FIG. 4.

By the above-described method, a determination is made on whether the runnable task rate (RT) and the CPU driving voltage and driving clock satisfy the hotplug condition based on cumulative values at their sampling time points. According to a result of the determination, hotplug-in or hotplug-out of a multi-core processor is determined or a decision is made on whether or not to preserve a current CPU driving status. According to the control method, a time when each core of a multi-core processor remains in an idle status may be reduced as compared to a time when a hotplug operation is performed with any one condition. Thus, power efficiency of the multi-core process may be maximized.

Figure 8:
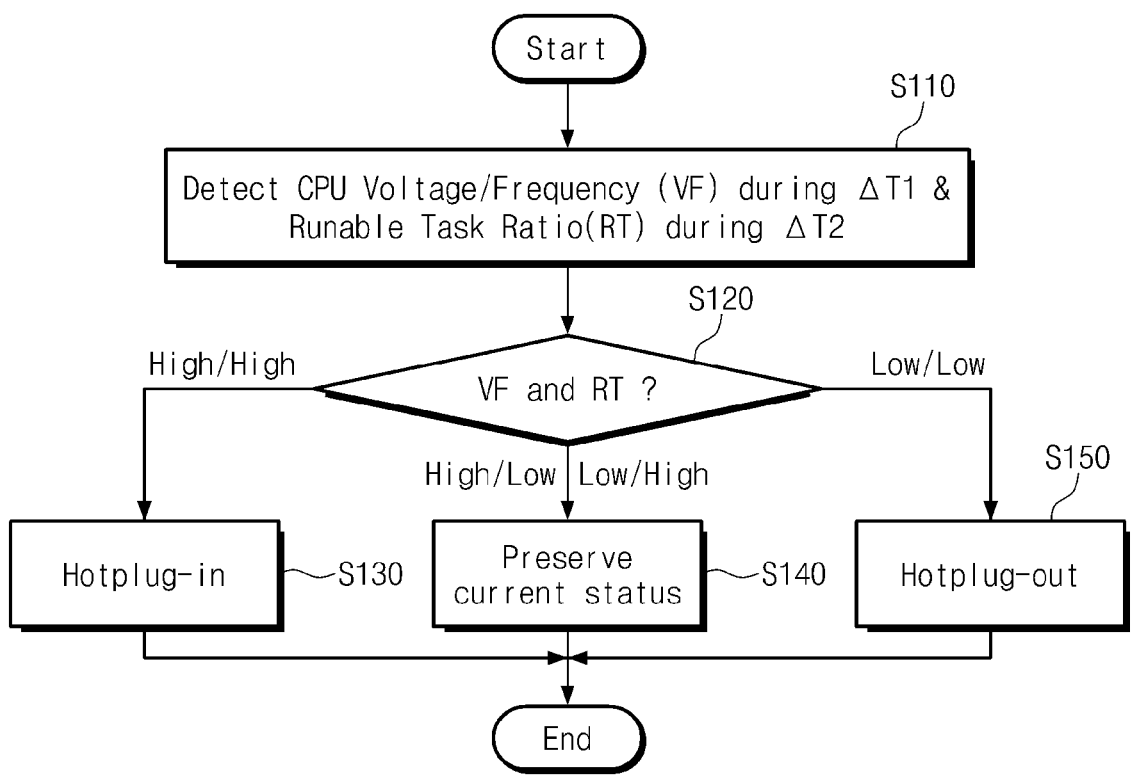
FIG. 8 is a flowchart illustrating a control method of a multi-core processor according to an exemplary embodiment of the present inventive concept.

FIG. 8 is a flowchart summarizing a control method of a multi-core processor according to an exemplary embodiment of the present inventive concept. Referring to FIG. 8, cumulative values of CPU driving voltage and driving clock (VF) and a runnable task rate (RT) may be monitored at a specific time point. According to a result of the monitoring, a hotplug operation of the multi-core processor may be performed.

A runnable task rate (RT) and CPU driving voltage and driving clock (VF) at a current time point may be monitored by a scheduler 135 and a CPU governor 137 of a kernel 134 (S110). For example, a runnable task rate (RT) sampled for a first time ($\Delta T1$) may be calculated and CPU driving voltage and driving clock (VF) for a second time ($\Delta T2$) may be detected.

A direction of a hotplug operation is determined according to the runnable task rate (RT) and the CPU driving voltage and driving clock (VF) (S120). For example, when the detected CPU driving voltage and driving clock (VF) is a high driving voltage and driving clock (High V/F) and the runnable task rate (RT) is greater than 1 (High), the process flow proceeds to S130. When the detected CPU driving voltage and driving clock (VF) is the high driving voltage and driving clock (High V/F) and the runnable task rate (RT) is equal to or smaller than 1 (Low), the process flow proceeds to S140. In contrast, when the detected CPU driving voltage and driving clock (VF) is the low driving voltage and driving clock (Low V/F) and the runnable task rate (RT) is greater than 1 (High), the process flow also proceeds to S140. When the detected CPU driving voltage and driving clock (VF) is low driving voltage and driving clock (Low V/F) and the runnable task rate (RT) is equal to or smaller than 1 (Low), the process flow proceeds to S150.

The kernel 134 may activate any one core that is in an off-line status (S130). A hotplug-in operation may be performed to assign a task loaded into a run queue to the activated core.

The kernel 134 may maintain a current CPU driving condition (S140). For example, the task loaded into the run queue may be assigned and process to currently activated cores without performing a hotplug-in or hotplug-out operation.

A hotplug-out operation may be performed to power off any one of the cores that are in an on-line status (S150).

The above steps may be repeated at each sampling time point of the CPU driving voltage and driving clock (VF) and the runnable task rate (RT). For example, when the CPU driving voltage and driving clock (VF) and the runnable task rate (RT) are sampled, a hotplug condition may be estimated considering variation of the runnable task rate (RT) sampled for the first time ($\Delta T1$) and variation of the CPU driving voltage and driving clock (VF) sampled for the second time ($\Delta T2$).

Figure 9:
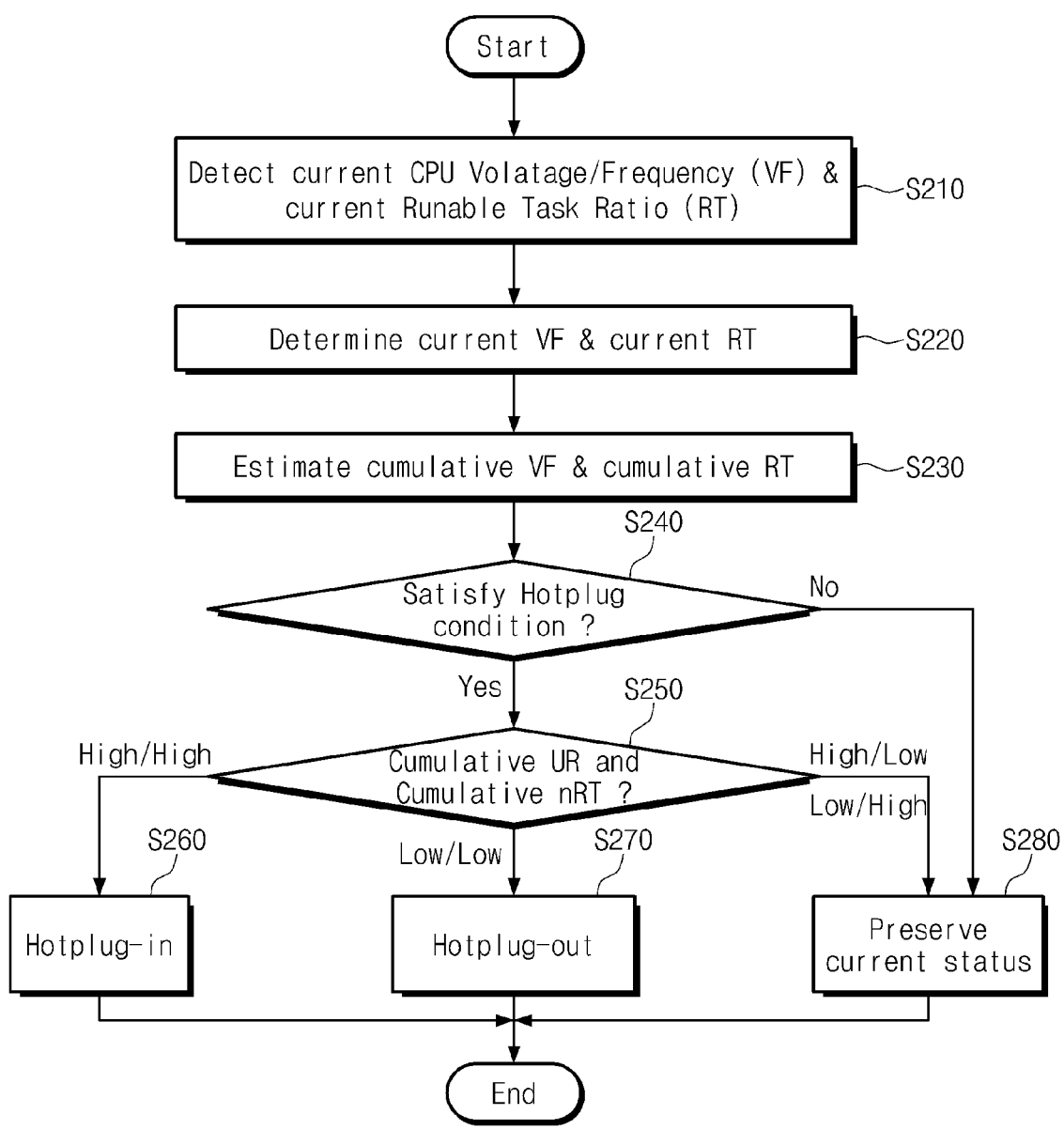
FIG. 9 is a flowchart illustrating a control method of a multi-core processor according to an exemplary embodiment of the present inventive concept.

FIG. 9 is a flowchart illustrating a control method of a multiple core processor according to an exemplary embodiment of the present inventive concept. Referring to FIG. 9, at a specific time point, CPU driving voltage and driving clock (VF) and a runnable task rate (RT) are monitored and a condition of a hotplug operation is determined.

A runnable task rate (RT) and CPU driving voltage and driving clock (VF) at a current time point may be monitored by a scheduler 135 and a CPU governor 137 of a kernel 134 (S210).

A current CPU driving voltage and driving clock (VF) and a current runnable task rate (RT) are determined (S220). For example, a CPU usage rate (VF) may be determined with reference to a frequency of a current CPU driving clock. In addition, the runnable task rate (RT) may be determined.

Cumulative CPU driving voltage and driving clock (VF) and a cumulative runnable task rate (RT) may be calculated (S230). For example, variation of the runnable task rate (RT) sampled from a current time point to a first time ($\Delta T1$) may be detected. In addition, variation of the CPU driving voltage and driving clock (VF) sampled from the current time point to a second time ($\Delta T2$) may be calculated.

An estimation may be made on whether or not a hotplug condition has been satisfied with reference to the cumulative CPU driving voltage and driving clock (VF) and the cumulative runnable task rate (RT) (S240). When the hotplug condition has not been satisfied (No, Step S240), the process flow proceeds to S280 to maintain a current CPU status. When the hotplug condition is satisfied (Yes, Step S240), the process flow proceeds to S250.

A direction of the hotplug operation is determined according to the runnable task rate (RT) and the CPU driving voltage and driving clock (VF) (S250). For example, when the detected CPU driving voltage and driving clock (VF) is the high driving voltage and driving clock (High V/F) and the runnable task rate (RT) is greater than 1 (High), the process flow proceeds to S260. When the detected CPU driving voltage and driving clock (VF) is the high driving voltage and driving clock (High V/F) and the runnable task rate (RT) is equal to or smaller than 1 (Low), the process flow proceeds to S280. In contrast, when the detected CPU driving voltage and driving clock (VF) is the low driving voltage and driving clock (Low V/F) and the runnable task rate (RT) is greater than 1 (High), the process flow proceeds to S280. When the detected CPU driving voltage and driving clock (VF) is the low driving voltage and driving clock (Low V/F) and the runnable task rate (RT) is smaller than 1 (Low), the process flow proceeds to S270.

The kernel 134 activates at least one of the cores that are in an off-line status (S260). For example, a hotplug operation is performed to supply power to any one selected core. A task loaded into a run queue may be assigned to the activated core.

The kernel 134 may perform a hotplug-out operation to power off any one of the cores that are in an on-line status (S270).

The kernel 134 may preserve a current CPU driving condition (S280). For example, the task loaded into the run queue may be assigned and processed to currently activated cores without performing a hotplug-in or hotplug-out operation.

The above steps may be repeated at each sampling time point of the CPU driving voltage and driving clock (VF) and the number of runnable tasks.

Figure 10:
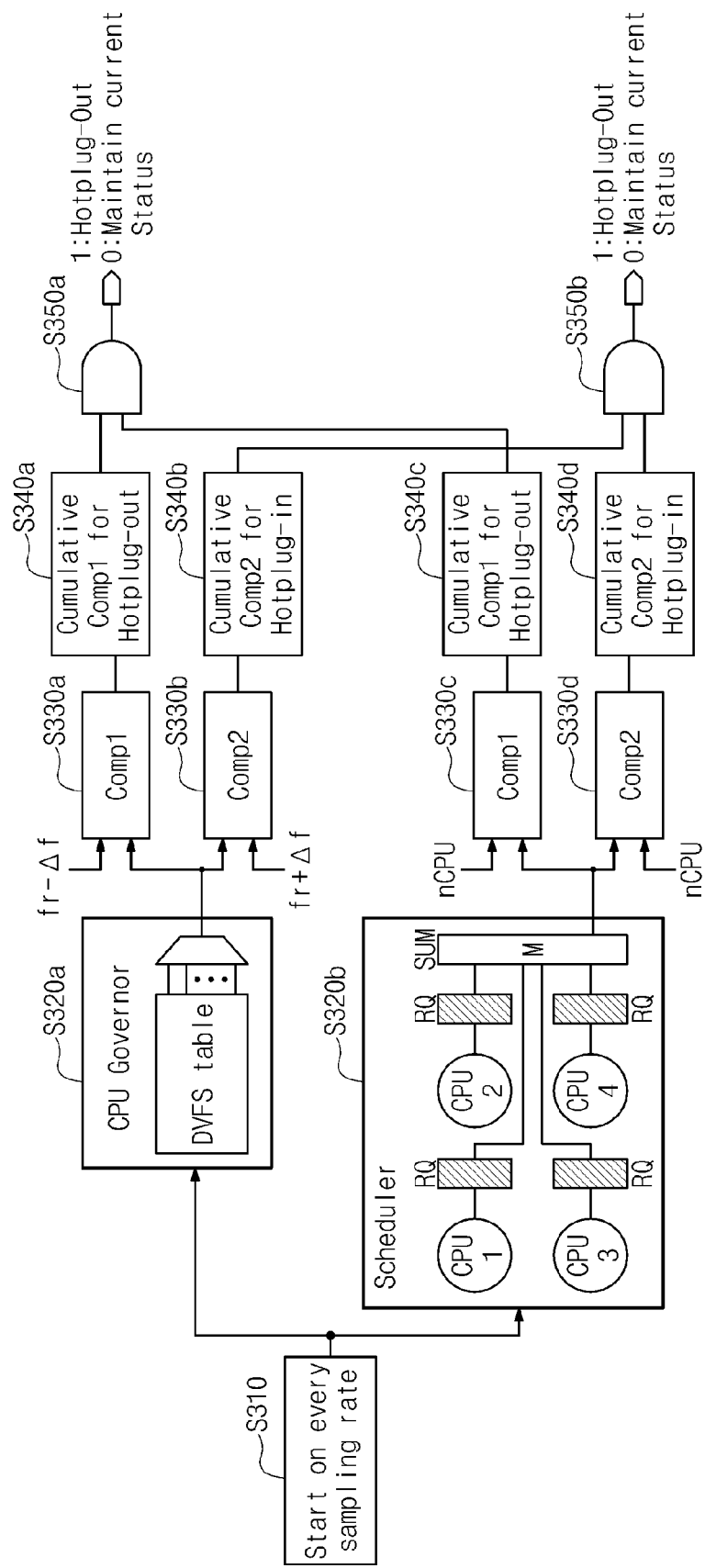
FIG. 10 is a conceptual diagram illustrating a control method of a multi-core processor according to an exemplary embodiment of the present inventive concept.

FIG. 10 is a conceptual diagram illustrating a control method of a multi-core processor according to an exemplary embodiment of the present inventive concept. Referring to FIG. 10, at a sampling time point that occurs in a specific period, a determination is made on whether or not to satisfy a hotplug condition according to the inventive concept. Then a determination may be made on whether a current CPU driving status is preserved or hotplug-in or hotplug-out is performed.

Sampling may begin (S310). The sampling may be performed in a specific period based on a predetermined sampling rate. The sampling rate may be set to a time period which reflects both variation of CPU driving voltage and driving clock and variation of a runnable task rate (RT) loaded into a run queue. For example, the sampling rate may be set to a period capable of maximizing power efficiency of the CPU 110 by performing hotplug-in or hotplug-out at an optimal time point.

Monitoring is performed by a CPU governor 137 (see FIG. 3) and a scheduler 135 (see FIG. 3) (S320a and 320b). The GPU governor 137 may monitor CPU driving voltage and driving clock (VF) at a current time point (S320a). A DVFS level may be used as an example of the CPU driving voltage and driving clock (VF). The CPU governor 137 may select a frequency of a driving clock CLK provided to a power domain of the CPU 110 in a DVFS table at the current time point. The scheduler 135 collects tasks that are loaded into run queues RQ of multi-core processors, respectively (S230b). The scheduler 135 may collect and provide tasks respectively corresponding to run queues as runnable tasks. The steps S320a and 320b may be performed in parallel, at the same time, or sequentially.

Levels of the CPU driving voltage and driving clock (VF) and the runnable task rate (RT) at the current time point are determined (S330a, S330b, S330c, and S330d). A current frequency of the CPU driving clock and a first reference frequency (fr−Δf) are compared with each other (S330a). When the current frequency of the driving clock is lower than the first reference frequency (fr−Δf), the current CPU driving voltage and driving clock (VF) may be determined to be a low driving voltage and driving clock. The current frequency of the CPU driving clock and a second reference frequency (fr+Δf) are compared with each other (S330b). When the current frequency of the driving clock is higher than the second reference frequency (fr+Δf), the current CPU driving voltage and driving clock (VF) may be determined to be a high driving voltage and driving clock. The number of current runnable tasks and the number of cores that are in an on-line status (nCPU+n) are compared with each other (S330c and S330d). When the number of the on-line cores (nCPU) is equal to or greater than the number of the runnable tasks, a current runnable task rate (RT) may be determined as a value equal to or smaller than 1 (S330c). When the number of the on-line cores (nCPU) is smaller than the number of the runnable tasks, the current runnable task rate (RT) may be determined to be a value greater than 1 (S330d).

Cumulative CPU driving voltage and driving clock (VF) and a cumulative runnable task rate (RT) are determined (S340a, S340b, S340c, and S340d). A cumulative value of the CPU driving voltage and driving clock (VF) sampled from a current time point to a specific time (ΔT1) may be calculated (S340a and S340b). A determination is made on whether the cumulative CPU driving voltage and driving clock (VF) satisfy a hotplug-out condition (S340a). When the cumulative CPU driving voltage and driving clock (VF) satisfy the hotplug-out condition, a result value may be generated as logic '1'. When the cumulative CPU driving voltage and driving clock (VF) does not satisfy the hotplug-out condition, a result value may be generated as logic '0'. A determination is made on whether the cumulative CPU driving voltage and driving clock (VF) satisfy a hotplug-in condition (S340b). When the cumulative CPU driving voltage and driving clock (VF) satisfy the hotplug-in condition, a result value may be generated as logic '1'. When the cumulative CPU driving voltage and driving clock (VF) does not satisfy the hotplug-in condition, a result value may be generated as logic '0'.

A cumulative value of the runnable task rate (RT) sampled from a current time to a specific time (ΔT2) may be calculated (S340c and S340d). A determination is made on whether a cumulative runnable task rate (RT) satisfies a hotplug-out condition (S340c). When the cumulative runnable task rate (RT) satisfies the hotplug-out condition, a result value is generated as logic '1'. When the cumulative runnable task rate (RT) does not satisfy the hotplug-out condition, a result value is generated as logic '0'. A determination is made on whether a cumulative runnable task rate (RT) satisfies a hotplug-in condition (S340d). When the cumulative runnable task rate (RT) satisfies the hotplug-in condition, a result value is generated as logic '1'. When the cumulative runnable task rate (RT) does not satisfy the hotplug-in condition, a result value is generated as logic '0'.

A determination is made on whether a hotplug-out operation is executed considering both the cumulative CPU driving voltage and driving clock (VF) and the accumulative runnable task rate (RT) (S350a). When both the cumulative CPU driving voltage and driving clock (VF) and the accumulative runnable task rate (RT) satisfy the hotplug-out condition, the kernel 134 may hotplug-out any one core of the CPU 110. However, when either one of the cumulative CPU driving voltage and driving clock (VF) and the accumulative runnable task rate (RT) does not satisfy the hotplug-out condition, a current CPU status may be maintained.

A determination is made on whether a hotplug-in operation is executed by considering both the cumulative CPU driving voltage and driving clock (VF) and the accumulative runnable task rate (RT) (S350b). When both the cumulative CPU driving voltage and driving clock (VF) and the accumulative runnable task rate (RT) satisfy the hotplug-in condition, the kernel 134 may hotplug-in any one core of the CPU 110. However, when either one of the cumulative CPU driving voltage and driving clock (VF) and the accumulative runnable task rate (RT) does not satisfy the hotplug-in condition, a current CPU status may be maintained.

Hitherto, the description has been made with respect to a hotplug method considering both cumulative CPU driving voltage and driving clock (VF) and a cumulative runnable task rate (RT). The hotplug method may minimize a time in which on-line cores are in an idle status.

Figure 11A:
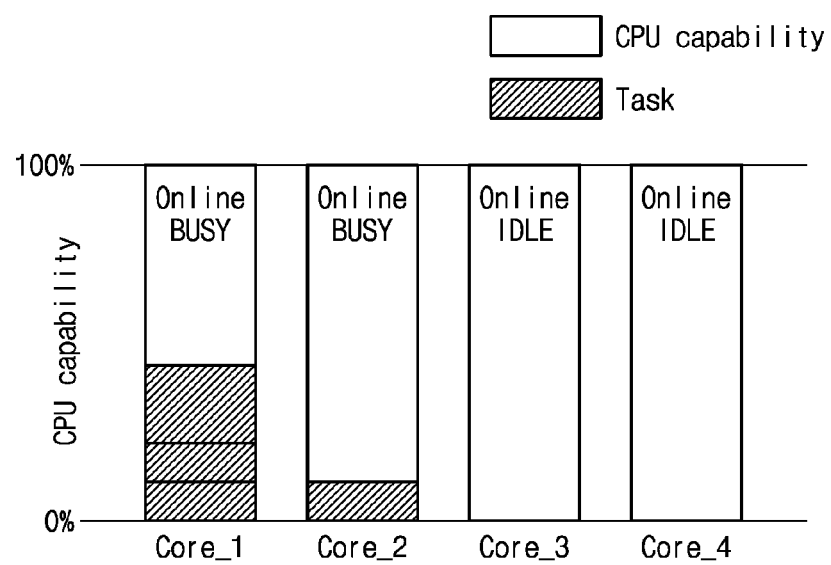
FIGS. 11A and 11B illustrate an effect of controlling a multi-core processor in accordance with exemplary embodiments of the present inventive concept.
Figure 11B:
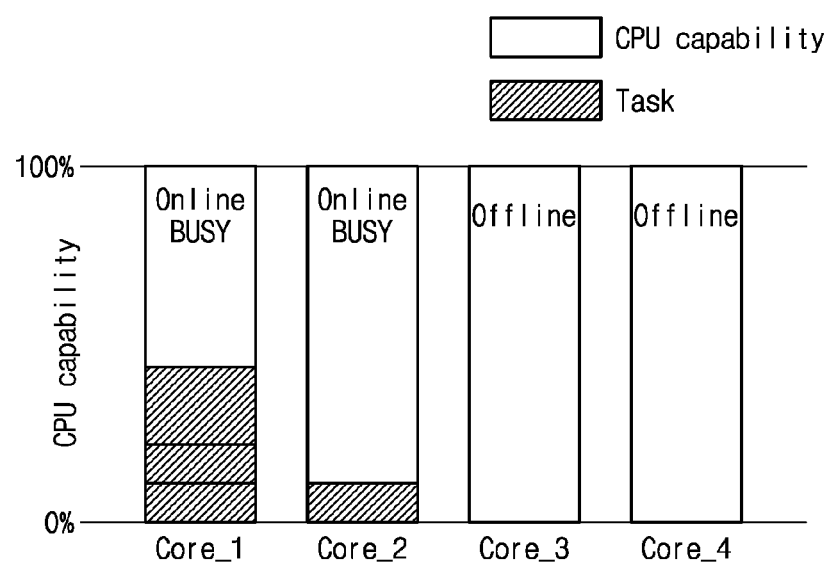

FIGS. 11A and 11B illustrate an effect of controlling a multi-core processor in accordance with exemplary embodiment of the inventive concept. FIG. 11A shows a situation in which four tasks are crowded in a first core Core_1 and a second core Core_2. If a hotplug operation is performed only considering a current runnable task rate (RT), a third core Core_3 and a fourth core Core_4 may still be maintained in an on-line status although they are in an idle status. However, when cumulative CPU driving voltage and driving clock (VF) and a cumulative runnable task rate (RT) are applied at the same time, the third core Core_3 and the fourth core Core_4 maintained in the idle state may be processed as hotplug-out. This is because current runnable tasks are determined to be sufficiently processed in the first core Core_1 and the second core Core_2 even when the CPU driving voltage and driving clock are not high. For this reason, the third core Core_3 and the fourth core Core_4 may be powered off to be converted into an off-line status, as shown in FIG. 11B.

Figure 12A:
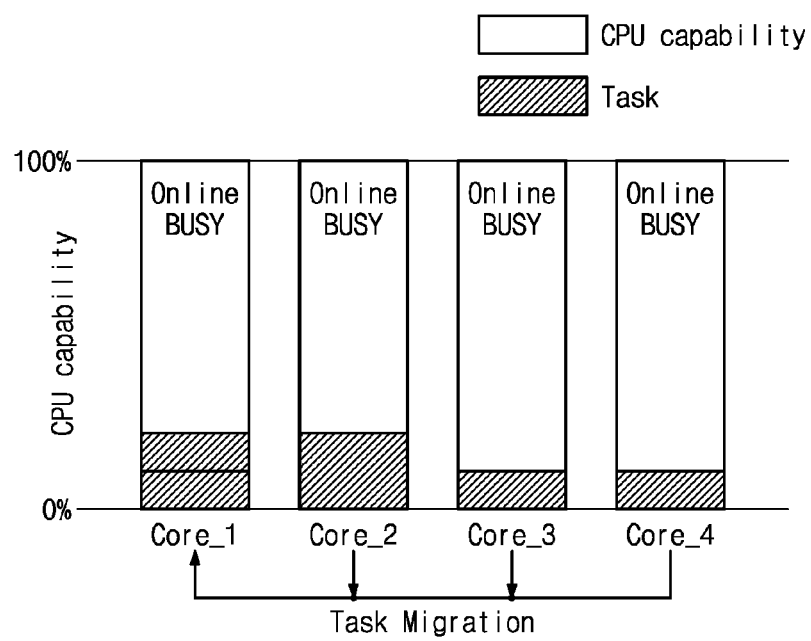
FIGS. 12A and 12B illustrate another effect of controlling a multi-core processor in accordance with exemplary embodiments of the present inventive concept.
Figure 12B:
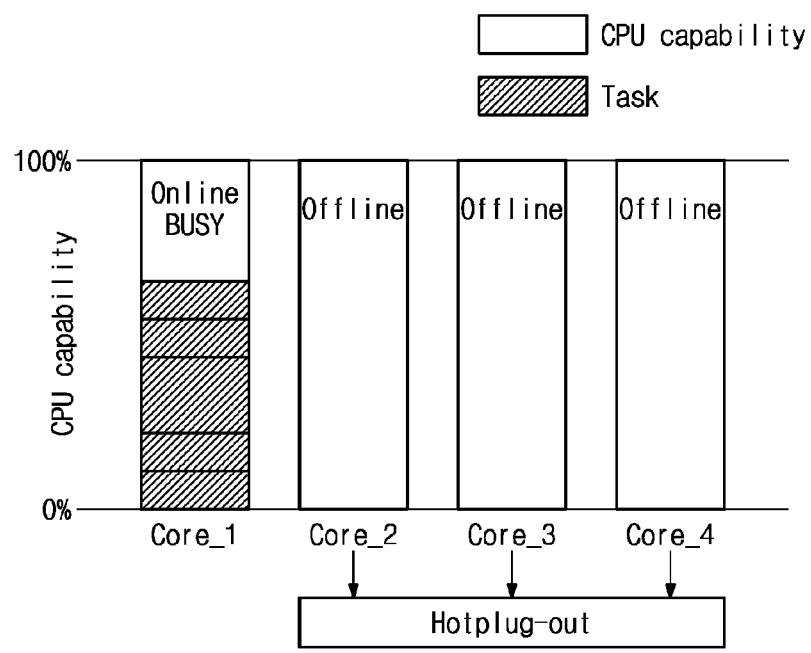

FIGS. 12A and 12B illustrate an effect of controlling a multi-core processor in accordance with exemplary embodiment of the present inventive concept. FIG. 12A shows a situation in which five tasks are relatively uniformly distributed in a first core Core_1 to a fourth core Core_4. It may be assumed that CPU driving voltage and driving clock of each of the first core Core_1 and the fourth core Core_4 is not high. When sampling is performed under the assumption, the CPU driving voltage and driving clock (VF) may be low and the number of runnable tasks may be five. Thus, a scheduler 135 may allow tasks assigned to the second core Core_2 to the fourth core Core_4 to migrate to the first core Core_1. This procedure is shown in FIG. 12A. When the tasks assigned to the second core Core_2 to the fourth core Core_4 migrate to the first core Core_1, the second core Core_2 to the fourth core Core_4 may be hotplugged out. This procedure is shown in FIG. 12B.

Figure 13:
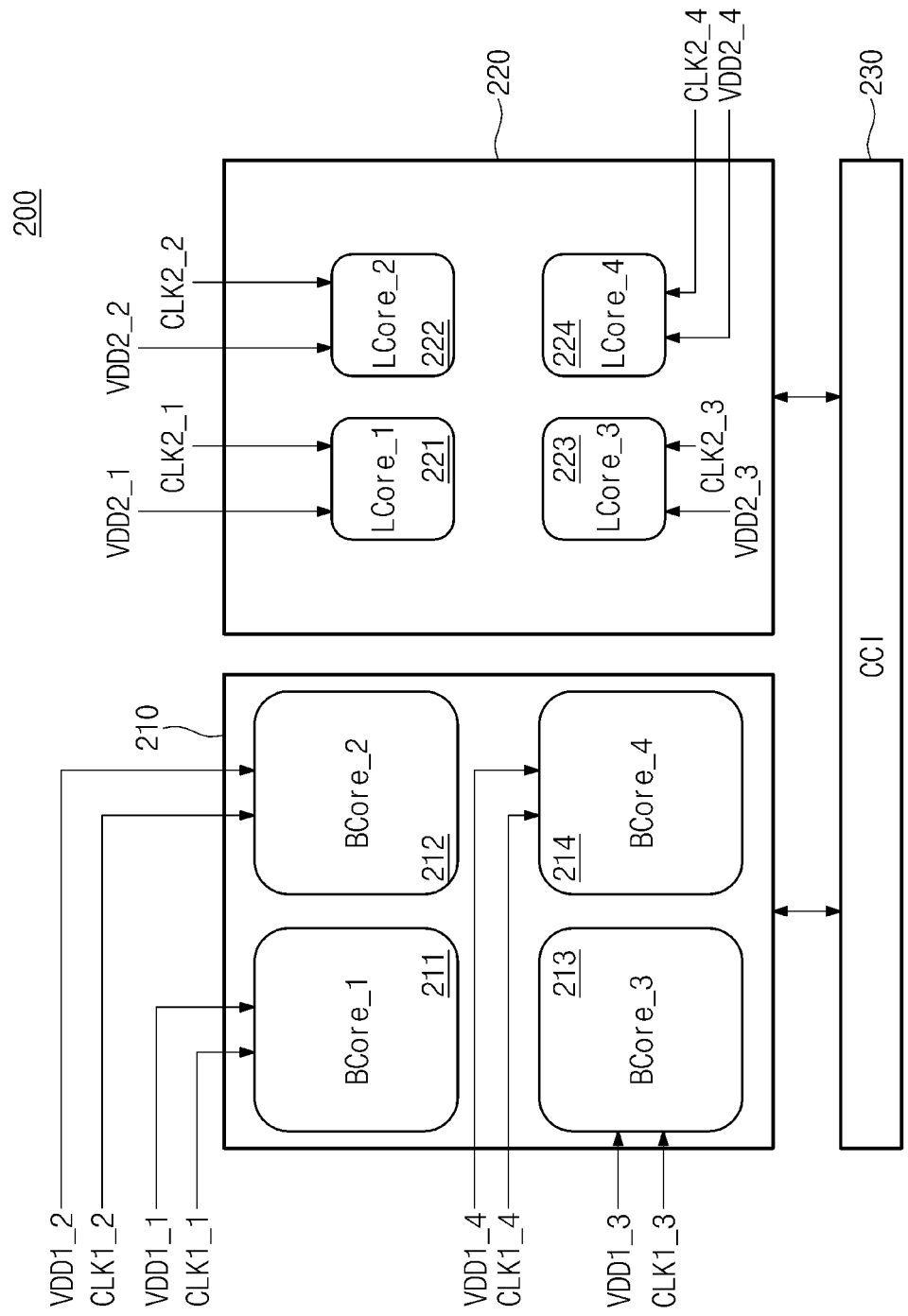
FIG. 13 is a block diagram of a multi-core processor according to an exemplary embodiment of the present inventive concept.

FIG. 13 is a block diagram of a multi-core processor according to an exemplary embodiment of the present inventive concept. An example of a CPU 200 including heterogeneous multi-cores is shown in FIG. 13.

The CPU 200 may include two or more types of heterogeneous multi-cores. According to some exemplary embodiments of the present invention, the CPU 200 may include a first cluster 210 and a second cluster 220. The first cluster 200 includes cores 211, 212, 213, and 214 that provide relatively high processing speed but have large power consumption. Each of the cores 211, 212, 213, and 214 may perform an independent operation, and its power may be controlled by a hotplug operation. A first multi-core 210 including the cores 211, 212, 213, and 214 receives a first driving voltage VDD1 and a first driving clock CLK1. Thus, the first cluster 210 forms a power domain that is independent of the second cluster 220.

The second cluster 220 includes cores 221, 222, 223, and 224 that provide relatively low processing speed but have high power efficiency. Each of the cores 221, 222, 223, and 224 may perform an independent operation. In addition, each of the cores 221, 222, 223, and 224 may include a processor of relatively lower performance than each of the cores 211, 212, 213, and 214. The second cluster 220 including the cores 221, 222, 223, and 224 receives a second driving voltage VDD2 and a second driving clock CLK2. Thus, the second cluster 220 may form a power domain that is independent of the first cluster 210.

A cache coherent interconnector (CCI) 230 supports migration between the clusters 210 and 220. For example, when the first cluster 210 is deactivated and the second cluster 220 is activated, cache data of the first cluster 210 is transferred to a cache of the second cluster 220. The cache coherent interconnector 230 may be provided as a structure for providing data coherency between the clusters 210 and 220.

In the heterogeneous multi-core CPU 200, a hotplug operation considering both a runnable task rate (RT) and CPU driving voltage and driving clock (VF) accumulated in a multi-core processor may be performed in units of clusters. For example, when the first cluster 210 is activated, detection of a hotplug condition and execution of hotplug-in or hotplug-out may be determined according to a usage rate of the cores 211, 212, 213, and 214 and a runnable task rate (RT). When the first cluster 210 is turned off and the second cluster 220 is activated, detection of a hotplug condition and execution of hotplug-in or hotplug-out may be determined according to driving voltage and driving clock and a runnable task rate (RT) of the cores 221, 222, 223, and 224. During a hotplug operation, each cluster may have a different CPU driving voltage and driving clock reference and a different runnable task rate (RT). In addition, migration between runnable tasks may occur between clusters.

In a heterogeneous multi-core CPU, a hotplug operation according to an exemplary embodiment of the present inventive concept may be performed in units of clusters respectively constituting different power domains.

Figure 14:
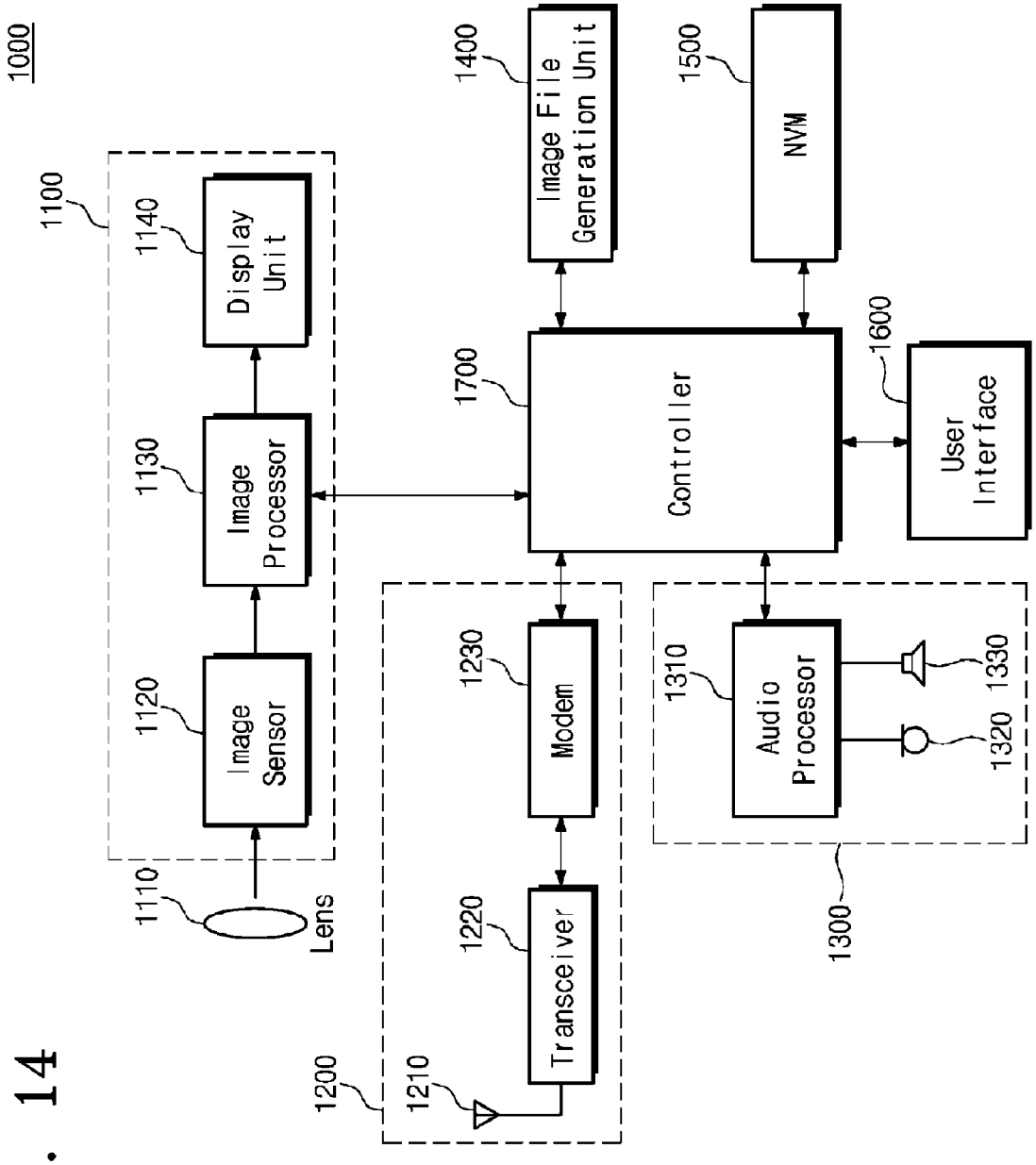
FIG. 14 is a block diagram illustrating a handheld terminal according to an exemplary embodiment of the present inventive concept.

FIG. 14 is a block diagram of a handheld terminal 1000 according to an exemplary embodiment of the present inventive concept. As illustrated, the handheld terminal 1000 includes an image processing unit 1100, a wireless transmission/reception unit 1200, an audio processing unit 1300, an image file generation unit 1400, a nonvolatile memory device (NVM) 1500, a user interface 1600, and a controller 1700.

The image processing unit 1100 includes a lens 1110, an image sensor 1120, an image processor 1130, and a display unit 1140. The wireless transmission/reception unit 1210 includes an antenna 1210, a transceiver 1220, and a modem 1230. The audio processing unit 1300 includes an audio processor 1310, a microphone 1320, and a speaker 1330.

The nonvolatile memory device (NVM) 1500 may be provided as a memory card (MMC, eMMC, SD, micro SD or the like) according to an exemplary embodiment of the present inventive concept. The controller 1700 may be provided as a system-on-chip (SoC) to drive an application program, an operating system (OS), and the like. A kernel of the operating system (OS) driven by the system-on-chip (SoC) may include a scheduler and a CPU governor. A driving voltage and a runnable task rate (RT) of multi-core processors are periodically sampled by the kernel. The sampled driving voltage and the sample runnable task rate (RT) are counted as cumulative values and determined to correspond to a hotplug condition. Only when both the conditions of the driving voltage and the runnable task rate (RT) are satisfied at the same time, hotplug-in or hotplug-out may be executed.

A system-on-chip (SoC) and/or a multi-core processor according to an exemplary embodiment of the present inventive concept may be packaged as one of various types to be subsequently embedded. For example, a flash memory device and/or a memory controller according to exemplary embodiments of the present inventive concept may be packaged by one of PoP (Package on Package), Ball grid arrays (BGAs), Chip scale packages (CSPs), Plastic Leaded Chip Carrier (PLCC), Plastic Dual In-Line Package (PDIP), Die in Waffle Pack, Die in Wafer Form, Chip On Board (COB), Ceramic Dual In-Line Package (CERDIP), Plastic Metric Quad Flat Pack (MQFP), Thin Quad Flatpack (TQFP), Small Outline (SOIC), Shrink Small Outline Package (SSOP), Thin Small Outline (TSOP), System In Package (SIP), Multi Chip Package (MCP), Wafer-level Fabricated Package (WFP), and Wafer-Level Processed Stack Package (WSP).

According to a mobile device and a control method thereof described above, unnecessary hotplug-in in a multi-core processor may be minimized to reduce power consumption.

While exemplary embodiments of the present disclosure have been particularly shown and described with reference to the figures, the general inventive concept is not limited to the above-described embodiments. It will be understood by those of ordinary skill in the art that various changes and variations in form and details may be made therein without departing from the spirit and scope of the inventive concept.

What is claimed is:

1. A control method of a system-on-chip including a multi-core processor, the control method comprising:
    detecting a rate of runnable tasks to be performed in the multi-core processor and a driving voltage or a driving clock of the multi-core processor;
    determining whether a variation of the rate of the runnable tasks, sampled from a first time point to a current time point, and a variation of the driving voltage or the driving clock, sampled from a second time point to the current time, satisfy a hotplug condition; and
    plugging in or out at least one core included in the multi-core processor when the rate of the runnable tasks and the driving voltage or the driving clock each satisfy the hotplug condition.

2. The control method as set forth in claim 1, wherein a sampling operation of detecting the rate of the runnable tasks and a sampling operation of detecting a driving voltage or a driving clock in the multi-core processor are performed at the same time.

3. The control method as set forth in claim 1, wherein the driving voltage or the driving clock is calculated with reference to a frequency of a driving clock or a level of a driving voltage provided to the multi-core processor.

4. The control method as set forth in claim 1, wherein in the determining operation, a hotplug condition for the rate of the runnable tasks corresponds to a case where the number of the tasks sampled two or more times for a first cumulative period from the first time to the current time is continuously maintained to be greater or smaller than the number of cores of the multi-core processor that are in an on-line status.

5. The control method as set forth in claim 4, wherein a hotplug-out condition corresponds to a case where the number of the tasks sampled for the first cumulative period is greater than the number of the cores of the multi-core processor that are in the on-line status, and a hotplug-in condition corresponds to a case where the number of the tasks sampled for the first cumulative period is smaller than the number of the cores of the multi-core processor that are in the on-line status.

6. The control method as set forth in claim 1, wherein in the determining operation, a hotplug condition for the driving voltage or the driving clock corresponds to a case where the driving voltage or the driving clock sampled two or more times for a second cumulative period from the second time to the current time is continuously maintained to be greater than or smaller than a reference usage rate.

7. The control method as set forth in claim 6, wherein a hotplug-in condition corresponds to a case where the driving voltage or the driving clock sampled for the second cumulative period is higher than a first reference value, and a hotplug-out condition corresponds to a case where the driving voltage or the driving clock sampled for the second cumulative period is lower than a second reference value lower than the first reference value.

8. The control method as set forth in claim 1, wherein in the determination operation, a current power status of the multi-core processor is not changed when the hotplug condition is not satisfied.

9. A system-on-chip comprising:
    a multi-core processor including a plurality of cores; and
    a working memory into which an operating system driven by the multi-core processor is loaded and in which a run queue corresponding to each of the cores is established,
    wherein the operating system includes a kernel adapted to control a hotplug operation of the multi-core processor, and the kernel determines when to execute the hotplug operation on each of the plurality of cores of the multi-core processor by using a result obtained by sampling a runnable task rate and a driving voltage and a driving clock of the multi-core processor,
    wherein the kernel is configured to determine to plug in or out at least one core, of the plurality of cores, when the runnable task rate changes.

10. The system-on-chip as set forth in claim 9, wherein the driving voltage or the driving clock of the multi-core processor is sampled using a frequency of a driving clock or a level of a driving voltage provided to the multi-core processor.

11. The system-on-chip as set forth in claim 9, wherein the run queue includes a queue corresponding to each of the plurality of cores of the multi-core processor.

12. The system-on-chip as set forth in claim 9, wherein the kernel monitors the number of tasks loaded into the run queue and includes a scheduler adapted to perform task migration.

13. The system-on-chip as set forth in claim 12, wherein the kernel includes a CPU governor adapted to monitor or control the driving voltage or the driving clock of the multi-core processor.

14. The system-on-chip as set forth in claim 9, wherein the multi-core processor is a heterogeneous multi-core processor in which the driving voltage or the driving clock varies in units of clusters, and the kernel performs the hotplug operation in units of the clusters.

15. The system-on-chip as set forth in claim 9, further comprising: a performance controller adapted to perform the hotplug operation of the multi-core processor by hardware according to the control of the kernel.

* * * * *